US009194517B2

(12) United States Patent  
Peirce

(10) Patent No.: US 9,194,517 B2  
(45) Date of Patent: Nov. 24, 2015

(54) TUBE SPLICING DEVICE

(71) Applicant: AGS I-Prop, LLC, Muskegon, MI (US)

(72) Inventor: John M. Peirce, Portage, MI (US)

(73) Assignee: AGS I-PROP, LLC, Muskegon, MI (US)

( * ) Notice: Subject to any disclaimer, the term of this patent is extended or adjusted under 35 U.S.C. 154(b) by 27 days.

(21) Appl. No.: 13/851,196

(22) Filed: Mar. 27, 2013

(65) Prior Publication Data

US 2013/0257041 A1  Oct. 3, 2013

Related U.S. Application Data

(60) Provisional application No. 61/616,127, filed on Mar. 27, 2012.

(51) Int. Cl.
   *F16L 33/00* (2006.01)
   *F16L 33/22* (2006.01)

(52) U.S. Cl.
   CPC ................................. *F16L 33/223* (2013.01)

(58) Field of Classification Search
   USPC ......... 285/419, 386, 397, 389, 398, 247, 383, 285/243
   See application file for complete search history.

(56) References Cited

U.S. PATENT DOCUMENTS

| | | | |
|---|---|---|---|
| 1,098,294 A * | 5/1914 | Patty | 285/249 |
| 1,844,023 A | 2/1932 | Terry | |
| 1,934,022 A * | 11/1933 | Wiggins | 285/289.3 |
| 2,513,115 A * | 6/1950 | Sprigg | 285/249 |
| 2,669,465 A * | 2/1954 | Newell | 285/53 |
| 3,843,169 A | 10/1974 | Wise | |
| 4,236,736 A * | 12/1980 | Anderson | 285/125.1 |
| 4,340,052 A | 7/1982 | Dennehey et al. | |
| 4,934,745 A | 6/1990 | Healy | |
| 5,388,871 A | 2/1995 | Saitoh | |
| 5,452,748 A | 9/1995 | Simmons et al. | |
| 6,003,906 A | 12/1999 | Fogarty et al. | |
| 6,517,122 B1 | 2/2003 | Minemyer | |
| 6,846,124 B2 | 1/2005 | Warburton-Pitt | |
| 6,916,051 B2 | 7/2005 | Fisher | |
| 7,108,292 B2 | 9/2006 | Lipscomb et al. | |
| 7,648,178 B1 | 1/2010 | Andros | |
| 7,690,699 B2 | 4/2010 | Smahl | |
| 2008/0272590 A1 * | 11/2008 | Howard et al. | 285/247 |

OTHER PUBLICATIONS

International Search Report and Written Opinion dated Jun. 28, 2013 for corresponding PCT Application No. PCT/2013/033979.
FlexWorks Barbed Fittings by OPW Fueling Containment Systems, Publication BFF-0001, dated Sep. 10, 2008.

* cited by examiner

*Primary Examiner* — Aaron Dunwoody
(74) *Attorney, Agent, or Firm* — Gardner, Linn, Burkhart & Flory, LLP

(57) ABSTRACT

A coupling device for coupling or splicing two fluid lines together includes a connector, a sleeve and at least one fastener. The connector has first and second end portions configured for insertion into first and second tube ends, respectively. The connector has an outer surface profile that includes at least one protrusion at each of the end portions for engaging an inner surface of a tube when the end portion is inserted into the tube end. The sleeve is configured for positioning at least partially around the connector and the tube ends disposed at the first and second end portions. The sleeve has an inner surface profile that generally corresponds with the outer surface profile of the connector, and the sleeve has an outer surface that has at least one threaded portion. The fastener threadedly engages the threaded portion of the sleeve and is tightened thereon.

22 Claims, 4 Drawing Sheets

TUBE SPLICING DEVICE

CROSS REFERENCE TO RELATED APPLICATION

The present invention claims the filing benefit of U.S. provisional application, Ser. No. 61/616,127, filed Mar. 27, 2012, which is hereby incorporated herein by reference in its entirety.

FIELD OF THE INVENTION

The present invention relates generally to couplers and fittings for joining or splicing fluid lines together.

BACKGROUND OF THE INVENTION

Fluid lines, conduits, hoses, and the like are commonly used for conveying fluids from one portion of a vehicle to another. Such conduits may be associated with fuel, engine and transmission oils and other lubricants, power steering fluid, coolants or refrigerants, hydraulic brake fluids, shock absorber fluid, ride-height control fluid, and/or the like. When a fluid line cracks or leaks, the line needs to be replaced or a damaged part of the line may be removed and the opposed ends of two separate lines may be spliced together.

SUMMARY OF THE INVENTION

The present invention provides a coupler or splicing assembly for use in coupling a fluid line. The coupler of the present invention includes a barbed connector that is inserted into the opposed ends of the fluid lines that are to be spliced together, and includes a sleeve or jacket that substantially envelopes or encases the tube and connector assembly so as to provide substantially uniform clamping around the tube and connector assembly when one or more fasteners are tightened onto the sleeve or jacket.

According to an aspect of the present invention, a coupling device for coupling or splicing two fluid lines together includes a connector, a sleeve and at least one fastener. The connector has first and second end portions configured for insertion into first and second tube ends, respectively. The connector has an outer surface profile that comprises at least one protrusion at each of the end portions for engaging an inner surface of a tube when the end portion is inserted into the respective tube end. The sleeve is configured for positioning at least partially around the connector and the tube ends disposed at the first and second end portions, and the sleeve comprises an inner surface profile that generally corresponds with the outer surface profile of the connector. The sleeve also includes an outer surface that has at least one threaded portion. The at least one fastener is configured for threaded engagement with the at least one threaded portion of the sleeve. When the at least one fastener is tightened onto the sleeve, the inner surface profile of the sleeve engages the tubes at the first and second end portions of the connector to substantially clamp around the tubes at the connector.

Optionally, the sleeve comprises threaded end regions at opposite ends thereof, and further comprises tapered end portions outboard of the threaded portions, and the fastener comprises a pair of female fasteners, each having an inner threaded portion and an inner tapered or conical surface, such that, when the fasteners are tightened onto the respective threaded end region of the sleeve, the tapered surfaces engage one another to compress or radially urge the sleeve end portions toward and into engagement with the tubes at the connector. Optionally, an outer surface profile of the sleeve may provide a non-circular shape or form (such as a hexagonal-shaped form or the like) that is configured for engagement with a wrench or the like to hold the sleeve while the fasteners are tightened thereon.

Optionally, the sleeve comprises first and second sleeve portions that are disposed along opposite sides of the connector and are drawn towards one another via tightening of fastener or fasteners. Optionally, the outer surface profile of the connector comprises a locating element and the inner surface profile of the sleeve comprises a locating element, such that, when the sleeve is disposed at least partially around the connector and tube ends at the connector, the locating element of the connector engages the locating element of the sleeve to align the inner surface profile with the outer surface profile.

Therefore, the coupler or splicer of the present invention facilitates coupling a fluid line to a connector or coupler. The fluid line coupler provides enhanced assembly and joining of two tube ends and substantially retains and seals the tube ends relative to one another. The fluid line coupler of the present invention provides a sleeve that is positionable at and over a connector that is received in opposed ends of two tubes, and the sleeve is clampable onto the connector and tube assembly to substantially retain the tubes at the connector and to limit fluid leakage at the joint or coupling. The sleeve or sleeve portions may be readily disposed at and aligned with the connector and tubes and may be clamped thereat via tightening of at least one fastener and preferably a fastener at each end of the sleeve.

These and other objects, advantages, purposes and features of the present invention will become apparent upon review of the following specification in conjunction with the drawings.

DESCRIPTION OF THE PREFERRED EMBODIMENTS

Figure 1:
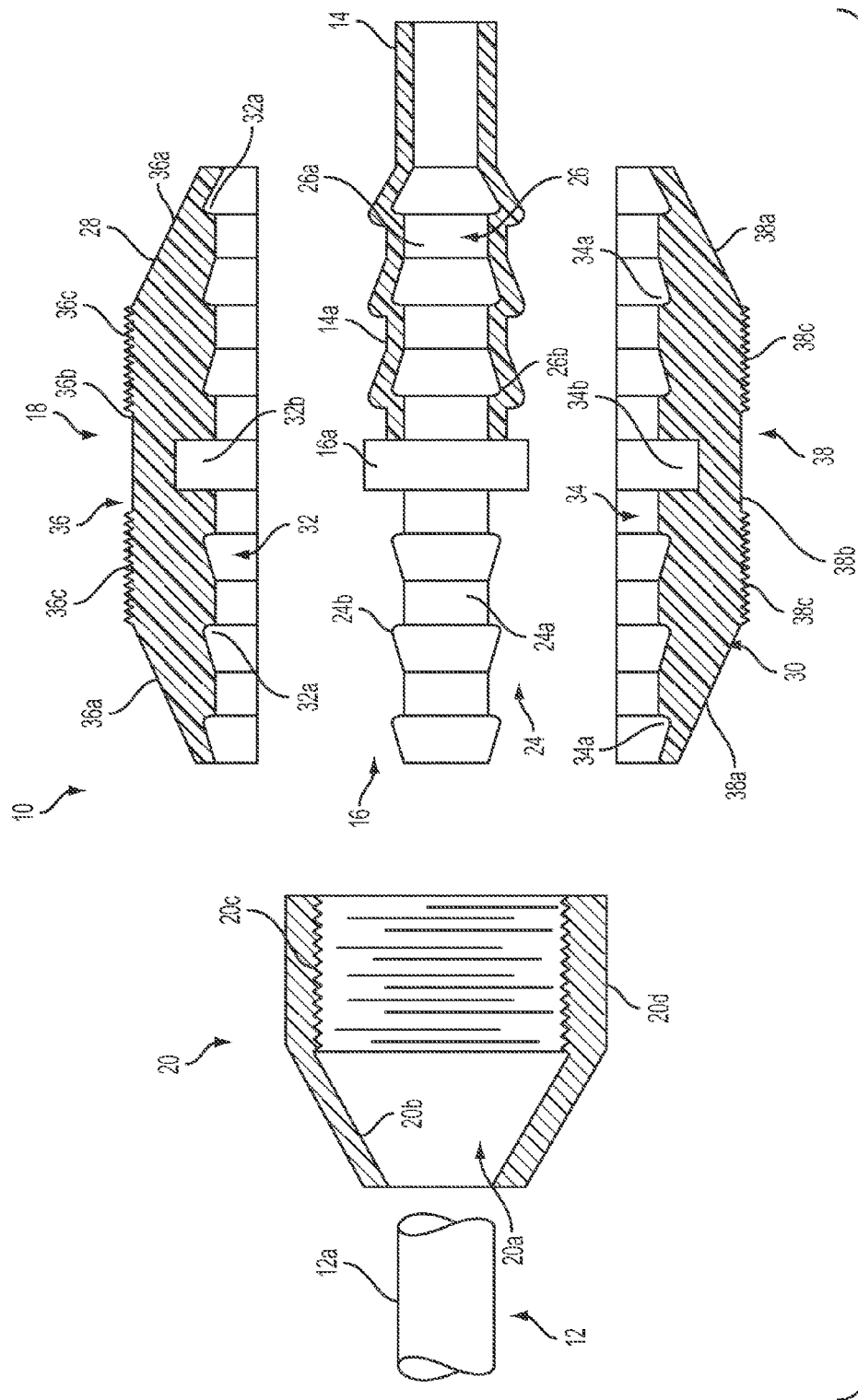
FIG. 1 is an exploded side elevation and partial sectional view of the coupler of the present invention, shown with a tube disposed at one end of the barbed connector.
Figure 2:
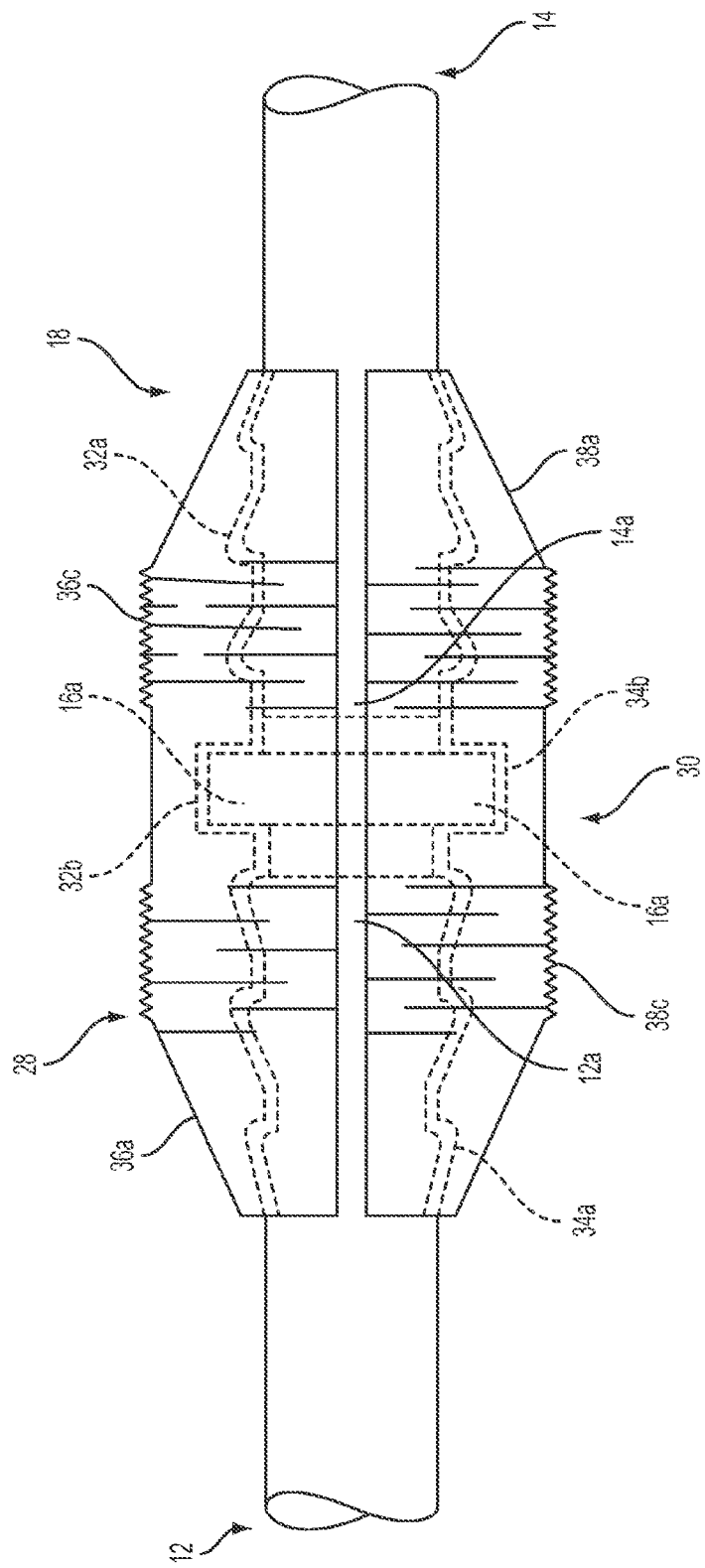
FIG. 2 is a side elevation of the sleeve of the coupler of FIG. 1, shown disposed at the barbed connector, with a tube disposed at each end of the barbed connector.
Figure 3:
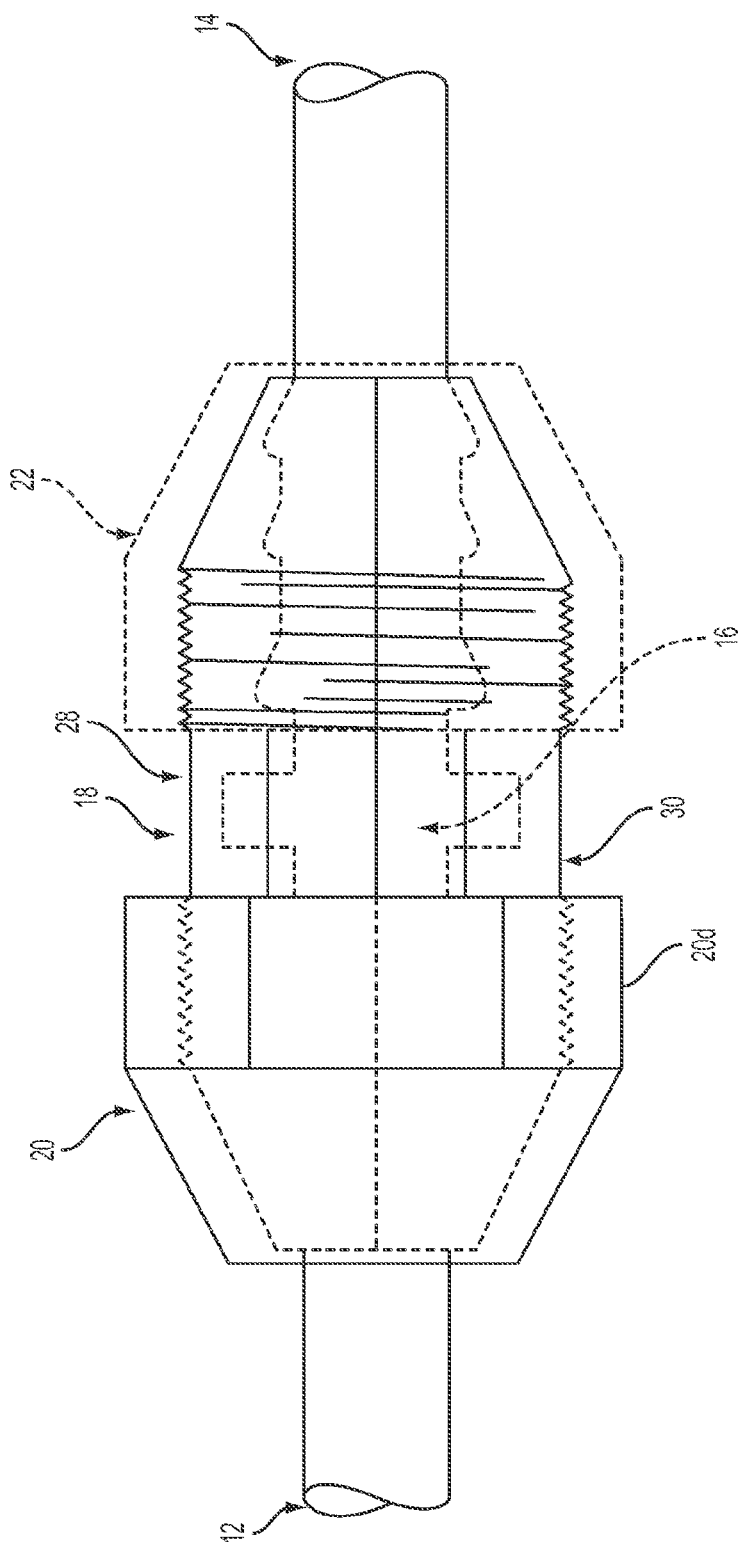
FIG. 3 is a side elevation similar to FIG. 2, shown with a threaded fastener tightened onto the sleeve to clamp the sleeve onto the tube and barbed connector disposed therein, in accordance with the present invention.
Figure 4:
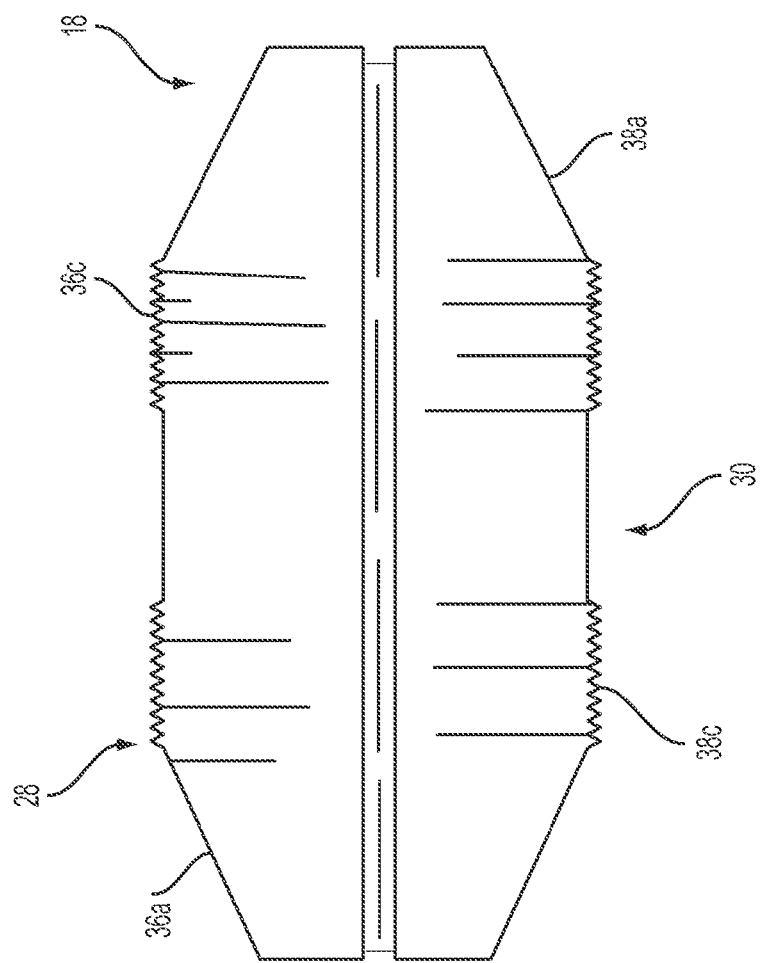
FIG. 4 is a side elevation of the sleeve of a coupler of the present invention, showing a hinged sleeve having living hinge joining the portions of the sleeve.

Referring now to the drawings and the illustrative embodiments depicted therein, a coupler or splicer or coupling assembly or device 10 for coupling two ends of tubes 12, 14 together includes a barbed connector 16, a sleeve or jacket 18 and a pair of female fasteners 20, 22 (FIGS. 1-3). The barbed connector 16 has opposite end portions 24, 26 that are received into the ends 12a, 14a of the respective tubes 12, 14, and the sleeve 18 includes opposite portions 28, 30 that are disposed along the connector 16 and tubes 12, 14 and clamped thereon via tightening of fasteners 20, 22, as discussed below. The coupler of the present invention thus provides enhanced connection of the tubes 12, 14, and limits or substantially precludes retraction or disconnection of the tubes from the coupler when the fasteners 20, 22 are tightened, as also discussed below. The coupler of the present invention is suitable for coupling any types of fluid lines together, and is suitable for coupling nylon fuel lines together.

As shown in FIG. 1, each end portion 24, 26 of connector 16 comprises a generally cylindrical tube 24a, 26a that has at least one, and preferably at least two or three, barbs or protrusions 24b, 26b disposed therealong. The end portions 24, 26 extend longitudinally from a generally centrally located or disposed stop element or location boss 16a. The diameter of the tube portions 24a, 26a and the barbs 24b, 26b are selected for the inner diameter of the selected tubes that are being spliced or joined together, so that the barbed end portions 24, 26 may be inserted or received into the tube ends 12a, 14a to generally retain the tubes at the connector 16. The connector 16 may comprise any suitable material, such as a polymeric material or metallic material, and may be a substantially rigid and non-flexible construction.

Although shown and described as having generally uniform and equidistantly spaced barbs along each connector end portion 24, 26, it is envisioned that any means for retaining the tubes on the end portions 24, 26 may be utilized. The barbs or protrusions or retention means may comprise ramped outer surfaces to allow the tube to be pressed along the connector end portion and over the retention means, and may have stepped or pointed rear or inner portions or surfaces to limit retraction of the tube (and optionally to bite into the tube if the tube is pulled away from the connector) after the tube has been urged and moved over the retention means. The retention means may comprise spaced apart conical shaped ramps, such as shown, or may comprise a plurality of discontinuous protrusions or teeth spaced radially and/or longitudinally along the connector end portions.

As shown in FIG. 1, a tube end 14a may be pressed or moved over the connector end portion 26, whereby the walls of the tube 14 may flex and generally conform to the shape of the connector end portion 26. The tube end 14a may be pressed or moved along the connector end portion 26 until the end of the tube contacts the location boss 16a (or until the tube end passes the innermost of the barbs or protrusions or retention means while being spaced from the location boss). After both tube ends 12a, 14a have been pressed onto the respective connector end portions 24, 26, the sleeve 18 may be disposed at and over the connector 16 and tube ends 12a, 14a and secured thereat via the fasteners 20, 22 (only fastener 20 is shown in FIG. 1, but fastener 22 is shown in phantom in FIG. 3).

In the illustrated embodiment, sleeve or jacket 18 comprises a two-piece construction having two halves or portions 28, 30, which are disposed at respective sides of the connector and tube assembly. As can be seen with reference to FIGS. 1 and 2, the sleeve portions 28, 30 have respective inner surfaces or profiles 32, 34 that generally match the outer profile of the connector 16 (and may have some variations in the profiles to account for the addition of the tubes at the connector), and outer surfaces or profiles 36, 38 that allow for attachment or engagement with the fasteners 20, 22. In the illustrated embodiment, the inner surfaces or profiles 32, 34 include recesses 32a, 34a for receiving the tube and barbs and a generally central recess or groove or channel 32b, 34b for receiving the location boss 16a when the sleeve portions 28, 30 are positioned at the connector and tube assembly. The location boss 16a, when aligned with and received in the recesses 32b, 34b of sleeve portions 28, 30, functions to locate the sleeve 18 and sleeve portions 28, 30 at the connector 16 to generally align the recesses 32a, 34a with the barbs so that the inner surfaces or profiles 32, 34 are generally aligned with the form or shape of the connector 16, and further functions to align the threaded portions of the sleeve portions with one another so that the threaded fasteners may threadedly engage the assembled sleeve, as discussed below.

The outer surface 36, 38 of each sleeve portion 28, 30 comprises opposite ramped or tapered or partial conical-shaped ends 36a, 38a, with a center portion 36b, 38b and threaded portions 36c, 38c. Optionally, the central portions 36b, 38b may comprise a respective portion of a hexagonal-shaped fastener or cross section, such that the central region (having a generally hexagonal-shaped cross section) can be engaged by a wrench to hold the sleeve (and connector and tubes) while another wrench tightens the fastener or fasteners, as discussed below. Although shown as having a diameter that generally corresponds with the diameter of the threaded portions of the assembled sleeve, the central portion of the sleeve may have a raised or larger diameter hexagonal-shaped (or other non-circular form) portion such that a similar sized wrench can be used for holding both the fasteners and the sleeve (with a gap established between the raised center region and the location of the end of the fastener when it is fully tightened onto the sleeve, so that the fastener does not bottom out at the center region during tightening onto the sleeve onto the threaded portions of the sleeve).

The sleeve portions 28, 30 each include threaded portions 36c, 38c (at opposite sides of the central portions 36b, 38b) for threadedly engaging the female fasteners 20, 22 to clamp or secure the sleeve 18 onto the tubes and connector 16, as discussed below. Optionally, the threaded portions 36c, 38c may have threads formed along a generally cylindrical center portion, or may have threads formed on a tapered or angled or slightly conical center portion, with the diameter of the central portion increasing towards its center, such that, as the fasteners 20, 22 are tightened along the threads of the center portion, the clamping force increases as the diameter of the threaded portion of the sleeve increases. The threads of the threaded portions of the sleeve portions 28, 30 are generally aligned to establish threaded end portions of the sleeve when the sleeve is assembled at the connector and tubes, as discussed below.

As shown in FIG. 1, fastener 20 comprises a threaded female fastener having a passageway 20a established therethrough, with a conical inner surface 20b and a threaded inner surface 20c (although only fastener 20 is shown in FIG. 1, fastener 22 is substantially similar in construction and function). The diameter of the inner threaded surface 20c generally coincides with the diameter of the threaded portions 36c, 38c of the sleeve 18 when the two sleeve portions 28, 30 are fully engaged or clamped together. The ramped or conical inner surface 20b generally coincides with the angle or shape of the tapered or conical-shaped ends 36a, 38a when the two sleeve portions 28, 30 are fully engaged or clamped together. An outer surface 20d of fastener 20 may provide a hexagonal shape or other shape suitable for engaging with a wrench or tool to assist in tightening the fastener onto the threaded portion of the sleeve.

Thus, during use of the coupler 10, two fluid lines or tubes or pipes 12, 14 may be disposed at or near one another and a fastener 20 is disposed at tube 12 and a fastener 22 is disposed at tube 14 (such as via tubes 12, 14 being inserted through the passageways 20a, 22a of the fasteners). After the fasteners 20, 22 are positioned on the tubes, a tube end 12a of tube 12 may be pressed onto connector end portion 24 of connector 16 until the end is at or near the location boss 16a, and a tube end 14a of tube 14 may be pressed onto connector end portion 26 of connector 16 until the end is at or near the location boss 16a. The tubes may be pressed onto the barbed end portions of the connector via any suitable means (and after inserting the tube ends through respective ones of the female fasteners 20, 22, as discussed below), such as, for example, by warming the tubes first or by using a tool to assist in pressing the tubes along the connector, and optionally such as by utilizing aspects of the tool and fluid line stabilizer described in U.S. patent application Ser. No. 13/653,538, filed Oct. 17, 2012, which is hereby incorporated herein by reference in its entirety.

After the tubes 12, 14 are so disposed on or along or at the connector 16, the two sleeve portions 28, 30 of sleeve or jacket 18 are disposed along the connector so that the location boss 16a is generally aligned with and optionally partially received in the recesses or channels 32b, 34b of sleeve portions 28, 30, such as shown in FIG. 2. When in this configuration, the sleeve portions 28, 30 may be spaced from one another and not clamped tightly against the tubes and connector, and some spacing may exist between the inner profiles 32, 34 of the sleeve portions 28, 30 and the outer surface of the tube ends 12a, 14a, and also between the channels 32b, 34b of sleeve portions 28, 30 and the location boss 16a of connector 16, such as can also be seen with reference to FIG. 2.

When the sleeve portions 28, 30 are so positioned, the threads of the threaded portions 36c, 38c of the sleeve portions 28, 30 are generally aligned (via the aligning feature of the location boss) so that fasteners 20, 22 may be moved along the tubes 12, 14 and moved into engagement with the tapered ends 36a, 38a of sleeve portions 28, 30 and with the threaded portions 36c, 38c of sleeve portions 28, 30. As a fastener 20, 22 is moved along the tube end 12a, 14a and into engagement with the respective end of the sleeve portions, the engagement of the tapered or conical inner surface 20b, 22b of the fastener with the tapered ends of the sleeve portions, and/or the threaded engagement of the threaded inner surface 20c, 22c of the fastener with the respective threaded portions 36c, 38c of the sleeve portions 28, 30, causes the sleeve portions 28, 30 to be urged together and into engagement with and compression of the tube on the connector end portions 24, 26. Further tightening of the fasteners 20, 22 on the threaded portions 36c, 38c of the sleeve 18 causes further clamping of the sleeve portions together and onto the tube and connector assembly, such as via the movement of the conical inner surface 20b, 22b along the conical outer surface of the sleeve and/or optionally via threaded engagement of the inner threads 20c, 22c along a tapered threaded portion of the sleeve. As can be seen in FIG. 3, when the fastener 20 is fully tightened onto the sleeve 18, the two sleeve portions 28, 30 may be substantially clamped together over the tube and connector assembly to substantially clamp the tube ends at and along the barbed connector portions, so as to limit or substantially preclude retraction of the tubes from the barbed connector portions and to limit fluid leakage between the inner passageway of the tubes and the connector.

Optionally, a sealing element (such as a resilient or compressible material or the like) may be disposed between the opposed edges or surfaces of the sleeve portions so that, when the sleeve portions are urged together as the fasteners are tightened, the sealing element may be substantially clamped and compressed between the sleeve portions to further seal the joint and limit fluid leakage. Although shown and described as comprising two separate halves or sleeve portions, the sleeve portions may comprise a single hinged sleeve (such as a unitarily formed sleeve with a living hinge formed or integrally molded along one of their adjoining edges) that provides a clam shell type configuration so that the sleeve may be folded or closed onto the tube and connector with an initial gap along one side or portion of the sleeve. Optionally, the sleeve edges may provide clasping or snapping means (such as via tabs or the like) so that the sleeve portions may be snapped together at the tube and connector configuration to provide a temporary attachment to ease the tightening of the fasteners onto the sleeve to securely clamp the sleeve at the tube and connector assembly. The sleeve portions may comprise any suitable material, such as a polymeric material or metallic material, and may be a substantially rigid and non-flexible construction, or may comprise a slightly flexible or malleable or compressible material to allow the sleeve portions to partially conform to the tube and connector assembly (and optionally may comprise a generally rigid outer material and a softer inner material or the like). Optionally, the sleeve portions may include rigid tooth portions therein that bite into the tubes when the sleeve is clamped onto the tube and connector assembly to further enhance retention of the tubes on the connector.

Therefore, the present invention provides a fluid line coupler that provides enhanced assembly and joining of two tube ends and that substantially retains and seals the tube ends relative to one another. The fluid line coupler of the present invention provides a sleeve that is positionable at and over a connector that is received in opposed ends of two tubes, and the sleeve is clampable onto the connector and tube assembly to substantially retain the tubes at the connector and to limit fluid leakage at the joint or coupling. The sleeve or sleeve portions may be readily disposed at and aligned with the connector and tubes and may be clamped thereat via tightening of at least one fastener and preferably a fastener at each end of the sleeve.

The inside profile of the protective sleeve or jacket assembly substantially matches the locations of the barbs on the pressed in connector or union. The center of the connector has a location boss to ensure that the protective jacket or sleeve assembly is correctly positioned at and over the connector and tube ends. The tapered ends of the sleeve assembly correspond to the inside tapered surfaces of the fasteners or tubing nuts or fittings that are threaded over the outer surface of the protective jacket or sleeve body and that compress or clamp the jacket or sleeve (such as two portions of a sleeve or a clamshell type of sleeve construction) directly over the tubes or lines (such as a nylon fuel line) and directly onto the retaining surfaces of the barbs of the connector such that, when the fasteners are tightened, the coupler limits or substantially precludes slippage of the tubes and/or leakage of fluid at the joint or coupling. The ends of the protective jacket or sleeve may include one or more ridges or teeth inside the inner profile that may bite into the tube or tubes to further grab and hold the tube or nylon line and secure the tube ends at the sleeve and connector. The coupler of the present invention may be assembled with standard hand tools as both the tubing nuts and the outer surface of the protective jacket may have standard hexagonal shapes or configurations and sizes. Optionally, the coupler may or may not include a mounting ring or circular wrap mounting bracket for screw mounting the coupler to a frame rail or the like after the repair is completed (in order to limit or reduce vibration and movement of the coupled joint). The outside shape of the protective jacket assembly, when the sleeve portions are aligned and assembled together may provide a hexagonal (or other non-circular shape) so that the sleeve can be held in place while tightening the fastener or tubing nuts/fittings, such as by using an open end wrench or adjustable wrench or the like.

Changes and modifications to the specifically described embodiments may be carried out without departing from the principles of the present invention, which is intended to be limited only by the scope of the appended claims, as interpreted according to the principles of patent law, including the doctrine of equivalents.

The embodiments of the invention in which an exclusive property is claimed are defined as follows:

1. A coupling device for coupling or splicing two fluid lines together, said coupling device comprising:
    a connector having first and second end portions configured for insertion into first and second tube ends, respectively, said connector having an outer surface profile that comprises at least one protrusion at each of said end portions for engaging an inner surface of a tube when said end portion is inserted into the tube end;
    a sleeve configured for positioning at least partially around said connector and the tube ends disposed at said first and second end portions, wherein said sleeve comprises an inner surface profile having a substantially similar contour as said outer surface profile of said connector, said inner surface profile having at least one recess at each of said first and second end portions that generally corresponds with the location of said at least one protrusion at each of said end portions of said connector, wherein said sleeve comprises an outer surface that has at least one threaded portion; and
    at least one fastener for threadedly engaging said at least one threaded portion of said sleeve, wherein, when said recesses are generally aligned with said protrusions and when said at least one fastener is tightened onto said sleeve, said inner surface profile of said sleeve engages the tubes at said first and second end portions of said connector to radially clamp the tubes at said connector.

2. The coupling device of claim 1, wherein said outer surface of said sleeve comprises a first threaded portion at a first end region of said sleeve that is disposed at said first end portion of said connector and wherein said outer surface of said sleeve comprises a second threaded portion at a second end region of said sleeve that is disposed at said second end portion of said connector, and wherein said at least one fastener comprises a first fastener that threadedly engages said first threaded portion of said sleeve and a second fastener that threadedly engages said second threaded portion of said sleeve.

3. The coupling device of claim 2, wherein said first end region of said sleeve includes a tapered outer surface and wherein said first fastener has a tapered inner surface, whereby, when said fastener is tightened onto said first threaded portion of said sleeve, said tapered inner surface of said first fastener engages said tapered outer surface of said sleeve and radially compresses said sleeve toward the tube and said first end portion of said connector.

4. The coupling device of claim 1, wherein said sleeve comprises first and second sleeve portions that are disposed along opposite sides of said connector and are drawn towards one another via tightening of said at least one fastener.

5. The coupling device of claim 4, wherein said sleeve is disposed at said connector and at least partially closed around said connector and the tube ends via tightening of said at least one fastener.

6. The coupling device of claim 1, wherein said outer surface profile of said connector comprises a locating element and wherein said inner surface profile of said sleeve comprises a locating element, and wherein, when said sleeve is disposed at least partially around said connector and tube ends at said connector, said locating element of said connector engages said locating element of said sleeve to align said inner surface profile with said outer surface profile.

7. The coupling device of claim 6, wherein said locating element of said connector comprises a generally central boss protruding radially outwardly, and wherein said locating element of said sleeve comprises a groove or channel for at least partially receiving said generally central boss of said connector when said sleeve is disposed at least partially around said connector and the tube ends at said connector.

8. The coupling device of claim 6, wherein said sleeve comprises first and second sleeve portions that are disposed longitudinally along diametrically opposite regions of said connector and are drawn towards one another via tightening of said at least one fastener.

9. The coupling device of claim 8, wherein, when said locating element of said connector engages said locating element of said sleeve, a threaded portion of said first sleeve portion is generally aligned with a threaded portion of said second sleeve portion.

10. The coupling device of claim 9, wherein said outer surface of said sleeve comprises a first threaded portion at a first end region of said sleeve that is disposed at said first end portion of said connector and wherein said outer surface of said sleeve comprises a second threaded portion at a second end region of said sleeve that is disposed at said second end portion of said connector, and wherein said at least one fastener comprises a first fastener that threadedly engages said first threaded portion of said sleeve and a second fastener that threadedly engages said second threaded portion of said sleeve, and wherein said first end region of said sleeve includes a tapered outer surface and wherein said first fastener has a tapered inner surface, whereby, when said first fastener is tightened onto said first threaded portion of said sleeve, said tapered inner surface of said first fastener engages said tapered outer surface of said sleeve and radially compresses said sleeve toward the tube and said first end portion of said connector, and wherein said second fastener has a tapered inner surface, whereby, when said second fastener is tightened onto said second threaded portion of said sleeve, said tapered inner surface of said second fastener engages said tapered outer surface of said sleeve and radially compresses said sleeve toward the tube and said second end portion of said connector.

11. The coupling device of claim 1, wherein said at least one protrusion comprises a plurality of barbs disposed along each of said first and second end portions of said connector, and wherein said inner surface profile of said sleeve comprises a plurality of recesses that generally correspond with the location of said plurality of barbs when said sleeve is disposed at least partially around said connector and the tubes disposed thereat.

12. The coupling device of claim 1, wherein an outer surface profile of said sleeve comprises a non-circular shaped portion that is configured for engagement with a wrench to hold said sleeve while said at least one fastener is tightened thereon.

13. The coupling device of claim 1, wherein said sleeve includes at least one rigid element at said inner surface profile for biting into the tube at said connector when said sleeve is positioned at least partially around said connector and the tube ends disposed at said first and second end portions of said connector.

14. A method of securing a clamp onto an inner element, said method comprising:
    providing an inner element having an outer profile having at least one protrusion;
    providing a clamp having an inner profile substantially similar to said outer profile of said inner element, wherein said inner profile has at least one recess, wherein said clamp comprises at least one threaded portion extending longitudinally along said clamp;

positioning a tube at said inner element so that said inner element is at least partially received in said tube with said at least one protrusion in the tube;

positioning said clamp at least partially around said inner element so that said at least one recess generally corresponds with the location of said at least one protrusion of said outer profile of said inner element; and securing said clamp relative to said inner element by tightening a threaded fastener onto said threaded portion of said clamp to induce a compression force at least at a portion of said tube that is at said at least one protrusion, wherein said portion of said tube at said at least one protrusion is at least partially received in said at least one recess of said inner profile of said clamp when said threaded fastener is tightened, and wherein tightening of said threaded fastener applies increased pressure to said clamp and said portion of said tube and said inner element.

15. The method of claim 14, wherein providing a clamp comprises providing a two piece clamping element with two longitudinal elements that are spaced apart when disposed at said inner element.

16. The method of claim 14, wherein providing a clamp comprises providing a clamshell element having two clamping elements joined together.

17. The method of claim 14, wherein said clamp comprises a tapered end and wherein said threaded fastener comprises a tapered inner surface, and wherein, as said threaded fastener is tightened onto said threaded portion, said tapered inner surface of said threaded fastener imparts said compression force at said tapered end of said clamp.

18. The method of claim 14, wherein said threaded portion is tapered such that as said threaded fastener is tightened along said threaded portion, said threaded fastener imparts said compression force at said threaded portion of said clamp.

19. The method of claim 14, wherein said inner element comprises a barbed connector that is partially received in opposed tubes for connecting said tubes, and wherein said clamp is disposed at least partially around said tubes and said connector.

20. The method of claim 19, wherein said clamp comprises a threaded portion at each end thereof, and wherein a respective threaded fastener is tightened onto a respective threaded portion to secure said clamp relative to said tubes and said connector.

21. The method of claim 20, wherein each threaded fastener receives a respective tube therethrough.

22. The method of claim 20, wherein an outer surface profile of said connector comprises a locating element and wherein said inner surface profile of said clamp comprises a locating element, and wherein, when said clamp is disposed at least partially around said connector and said tubes, said locating element of said connector engages said locating element of said clamp to align said inner surface profile with said outer surface profile.

* * * * *